United States Patent [19]

Eskesen

[11] 4,427,615

[45] Jan. 24, 1984

[54] METHOD OF MAKING INJECTION MOULDED PLASTIC OBJECTS WITH IMBEDDED DECORATIVE AND/OR DESCRIPTIVE PRINTS

[75] Inventor: Peder C. Eskesen, Holbaek, Denmark

[73] Assignee: Brdr. Eskesen Aktieselskab, Roedovre, Denmark

[21] Appl. No.: 324,501

[22] Filed: Nov. 24, 1981

[30] Foreign Application Priority Data

Dec. 9, 1980 [DK] Denmark ............................ 5250/80

[51] Int. Cl.³ ........................ B29C 11/00; B29D 3/00
[52] U.S. Cl. ................................. 264/261; 264/278
[58] Field of Search .............. 264/257, 275, 277, 278, 264/261; 425/110, 116, 125, 127, 117, 123, 124

[56] References Cited

U.S. PATENT DOCUMENTS

| | | | |
|---|---|---|---|
| 777,653 | 12/1904 | Foster | 264/275 |
| 1,301,069 | 4/1919 | MacDonald | 264/DIG. 34 |
| 2,110,091 | 3/1938 | Morse | 264/278 |
| 3,074,112 | 1/1963 | Bobrow | 264/275 |
| 4,016,235 | 4/1977 | Ferro | 264/275 |

*Primary Examiner*—Willard E. Hoag
*Attorney, Agent, or Firm*—Ladas & Parry

[57] ABSTRACT

A method of making injection moulded plastic objects with one, two or three imbedded decorative and/or descriptive prints comprises the steps of placing the prints on relatively thin foils (4, 5) of an extent corresponding to the cross-section of the mould cavity (6), and placing the foils (4, 5) in the mould cavity (6) with respect to the runner (3) so that the foils are pressed into engagement with the bottom and/or top of the mould cavity by the moulding material injected under pressure.

Thus, a plastic object with imbedded colored motifs at both the top side and the underside can be made by just one moulding operation.

3 Claims, 4 Drawing Figures

METHOD OF MAKING INJECTION MOULDED PLASTIC OBJECTS WITH IMBEDDED DECORATIVE AND/OR DESCRIPTIVE PRINTS

TECHNICAL FIELD

The invention relates to a method of making injection moulded, substantially sheet-shaped plastic objects with one, two or three imbedded foils with decorative and/or descriptive prints, e.g. multicoloured silk screen prints.

BACKGROUND ART

Such objects have been made for a long time by a two-step plastic moulding technique, where a lower part is moulded in a first mould above a plastic foil with a print prepositioned in the empty mould. Then a moulding operation is performed in the mould cavity over the lower part and the print, which faces upwards, to form a plastic moulding consisting of two halves and having a print imbedded approximately at the centre.

This known method provides products which meet all requirements as regards preservation of the quality of the print after imbedding, no formation of folds at the foil and no formation of blisters in the moulding, which is of course of a transparent, limpid plastic material, preferable acrylics.

However, this known method is relatively complicated because it requires the use of two injections moulds and transport of the half first moulded and positioning of this half and the foil in the other mould.

The Swedish Patent Specification No. 217 989 discloses a method of making injection moulded plastic objects which are provided with decorative prints. In this known method the foil provided with the print is placed at the bottom of the mould cavity, and the plastic moulding material is then introduced into the mould cavity under pressure. The foil is of such a type that it fuses with the injected plastic material without leaving visible traces, but so that the print itself remains at a distance from the mould cavity corresponding to the thickness of the foil.

In practice, however, it has been found that the foil does not fuse with the moulding material without leaving visible traces, and moreover air bubbles tend to form around the film at the underside of the object. Another point is that the method disclosed by the Swedish Patent Specification No. 217 989 can only be used for imbedding prints either at the underside or top side of the object.

DISCLOSURE OF INVENTION

The object of the invention is to provide a method of making plastic objects with imbedded decorative and/or descriptive prints, which method is to allow the object to be moulded in one moulding operation though it contains a foil with print both at the underside and top side of the object. Also, the method must be of such a type as will prevent formation of folds in the foils and/or air bubbles in the plastic object.

This object is achieved according to the invention by a method of the type mentioned in the opening portion and characterized in that the foils are spaced above a pin extending in the vertical direction in the mould cavity and that the moulding material is subsequently injected under pressure into the mould cavity about the pin and between the foils.

By such a method it is obtained that the pin extending in the vertical direction in the mould cavity can be used to initially keep the two foils apart, whereupon the moulding material can be injected under pressure through a runner positioned in such a way that the moulding material is led towards the pin which thereby serves to distribute the moulding material above the total width of the mould cavity and simultaneously to a certain extent to check the advance of the moulding material at the front part of the mould cavity, whereby the foils are at once pressed into engagement with the upper and lower part of the mould cavity. Thereby, the advance of moulding material between the undersides of the foils and the boundary surfaces of the mould is counteracted.

To this may be added that the foils can be placed above the pin being necessary in any case in the method of making plastic objects such as key rings etc. to provide an eyelet to receive the split ring to which the keys are affixed.

Moreover, the invention relates to an apparatus for use when working a method according to the invention. The apparatus is characterized in that a pin extending through the mould cavity has an upper part of a relatively small diameter and a lower part of a relatively large diameter to form a shoulder at the upper part of the pin.

Thereby, it is obtained that one foil can be provided with an orifice of such a size that it slides down the pin and is caused to engage the underside of the mould, whereas the other foil can have such an orifice that the foil will ride on the said shoulder at the upper end of the pin.

In still another method of the invention the object provided with the two foils may be placed in the lower part of a mould cavity above a pin extending through said cavity and having a tapering upper part, and a third foil with an orifice corresponding to the tapering part may then be placed, and then plastic moulding material is injected into the remaining part of the mould cavity, said plastic moulding material pressing the foil against the top of the mould cavity and fusing with the foil at the top side of the lower half to form an object with three prints spaced in the vertical direction.

This combination of the familiar injection moulding technique, where a lower half is fused with an upper half in a moulding number two, enables an object to be made by means of just two moulding operations with three prints spaced in the vertical direction of the object.

The invention also relates to a plastic moulding made by a method according to the invention, said object being characterized in that it is of plastics, preferably acrylics.

By making the injection moulded plastic object of plastics, such as acrylics, a durable and very handy object is obtained being suitable for use as key charm and the like.

In a possible embodiment of a plastic moulding according to the invention the foils can be of exactly the same size as the underside and top side of the finished object with which they are moulded together.

Thereby, during the making the advantage is obtained that during the moulding operation the foils are moved like rams against the boundary surfaces of the mould when the moulding material is injected. In the finished object the outer edge of the foils are congruent with the side edge of the moulding which prevents the foils from working loose at the edge areas.

BRIEF DESCRIPTION OF THE DRAWINGS

The invention will be explained more fully below with reference to the drawing, in which.

BEST MODE OF CARRYING OUT THE INVENTION

Figure 1:
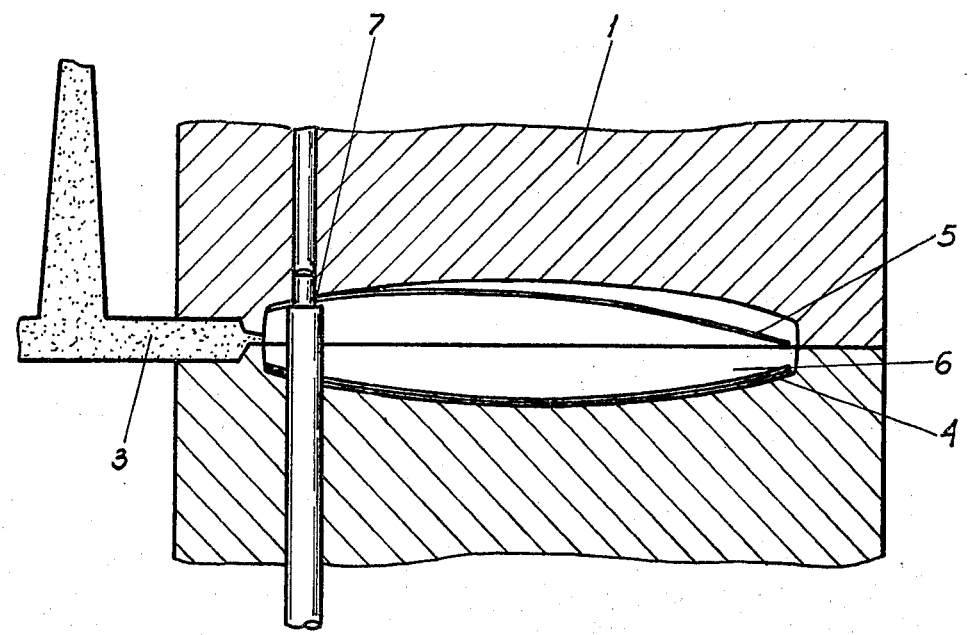
FIG. 1 shows a cross-section of a mould arranged to make a plastic object with two imbedded foils.
Figure 4:
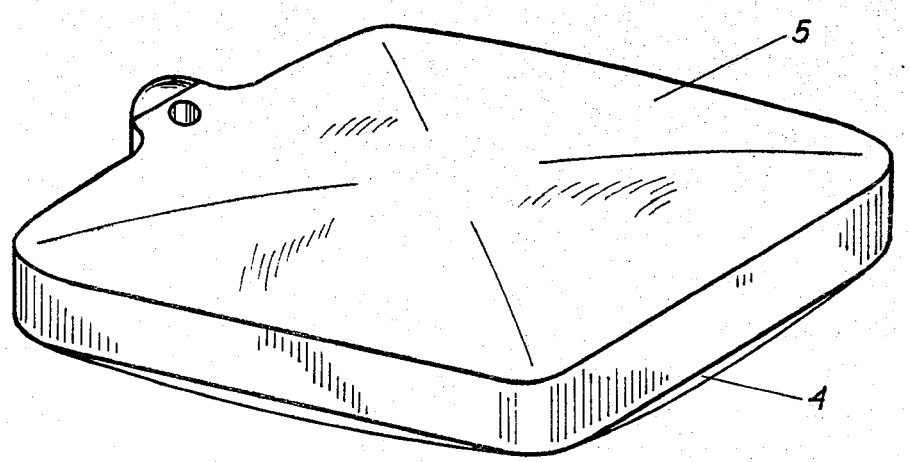
FIG. 4 shows an object made by the method of the invention.

As appears from FIG. 1 of the drawing the mould 1 for making the plastic object comprises two mould halves in a quite known manner, and a mould cavity 6 is formed around the dividing plane of the mould halves. A pin 2 is passed through the mould cavity and is provided with a step or a so-called carrying shoulder 7 at its upper portion. The liquid plastic moulding material is introduced into the mould cavity through a runner 3. Prior to the introduction of the moulding material, a lower foil 4 has been placed above the pin 2, and this foil 4 has such an orifice as will allow it to be moved down over the thick portion of the pin and be caused to engage the mould bottom. In contrast, the upper foil 5 has such an orifice as will cause the foil to hang over the carrying shoulder 7.

When the plastic moulding material is introduced into the mould cavity 6 under pressure, the foils are pressed against the bottom and top of the mould cavity, to thereby provide a seal along the side walls of the mould cavity against plastic moulding material entering behind the foils.

The foils are disposed so that the printed coloured motif is positioned on the side thereof facing the dividing plane of the mould.

It will be readily appreciated that this method provides for the production of an object where only one print is provided either at the underside or top side of the object, as the upper or the lower foil may be omitted.

Figure 2:
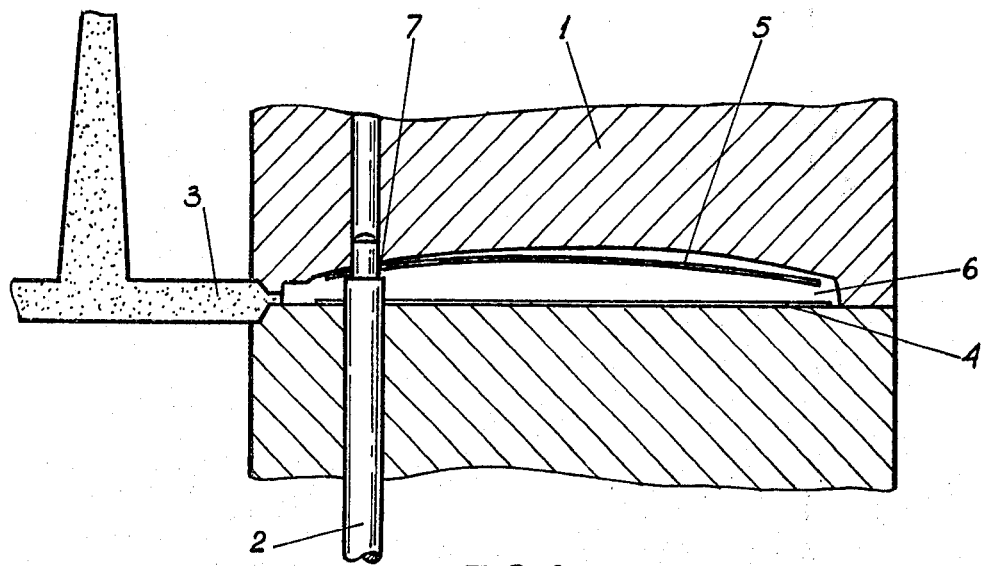
FIG. 2 shows a cross-section of a mould for making a half provided with two foils.

The picture shown in FIG. 2 corresponds substantially to the picture shown in FIG. 1, with the exception that the object made by this mould is arranged to constitute a lower half in a subsequent moulding, and the surface of the object shown at the bottom of fig. is therefore plane.

Figure 3:
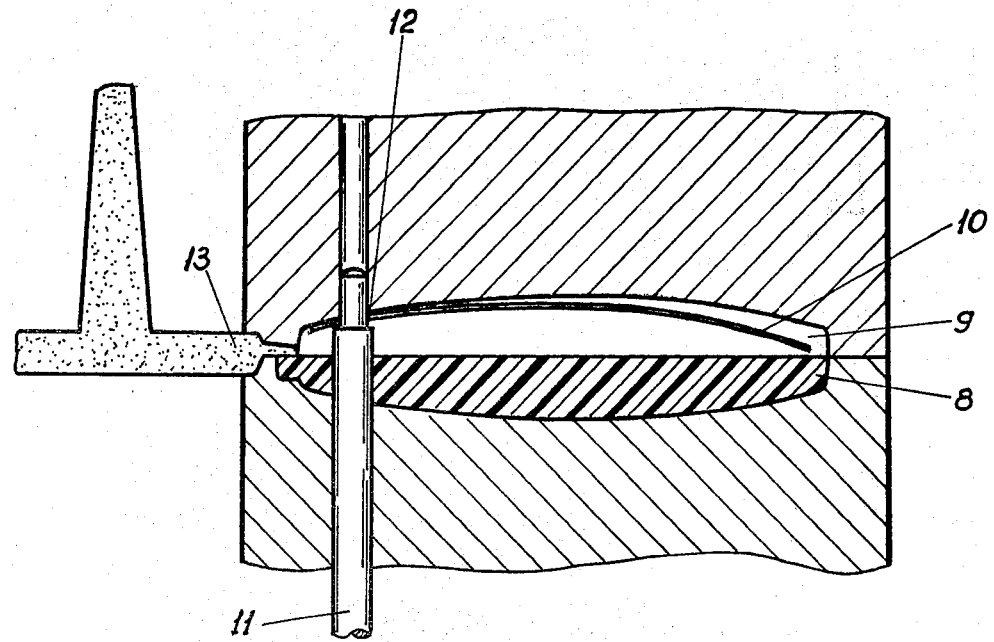
FIG. 3 shows a cross-section of a mould for making an over-moulding of the object made by means of the mould of FIG. 2.

It is shown in FIG. 3 how the lower half 8 made by the mould of FIG. 2 is placed at the bottom of a mould cavity 9 above a pin 11 extending therethrough, said pin being formed in the same manner as the pin 2 in the embodiment shown in FIGS. 1 and 2. Prior to the over-moulding of the lower mould half 8, a third foil 10 is placed over a carrying shoulder 12 at the upper end of the pin.

When the plastic moulding material is introduced through the runner 13, the foil 10 is pressed into engagement with the upper wall of the mould cavity 9, and, as in the known methods, moulding with the lower mould half 8 takes place as the surface of the lower mould half 8 fuses with the moulding material introduced.

The object made by the method shown in FIGS. 2 and 3 thus contains a total of three prints which are spaced in the object in its vertical direction.

Plastic objects of any type can be made by a method according to the invention, but the method is particularly expedient for the making of articles such as key tags of acrylics and de-cappers with imbedded beer bottle openers and colour prints.

I claim:

1. A method of manufacturing of an article covered by a foil embedded in an outside surface of said article, and having an aperture going there through, by an injection of a moulded material in a mould, which comprises:
   (a) placing foils in two halves of the mould;
   (b) inserting a pin inside of said mould in such manner that said pin will go through the foil located in one half of the mould and will support the foil located in another half of the mould, whereby said foils are kept separately from each other;
   (c) injecting of a moulding material into said mould between said foils and around said pins;
   (d) removing said pin from said mould; and
   (e) removing said article from said mould.

2. A method according to claim 1 wherein the pin with substantially uniform crossection has a portion at one end thereof with a crossection substantially smaller than the crossection of said uniform part, a shoulder is defined at a place of a protrusion of the portion with said smaller crossection from the portion of the pin with uniform crossection and whereby said portion of said pin having the smaller diameter goes through an aperture in the foil, engages with one half of the mould and said shoulder secure said foil to said half of the mould.

3. A method of manufacturing of an object according to claim 2 wherein the moulded material is an acrylic plastic.

* * * * *